(12) United States Patent
Courchaine et al.

(10) Patent No.: US 9,360,645 B2
(45) Date of Patent: Jun. 7, 2016

(54) MODULE, LIVING HINGE

(71) Applicant: AFL TELECOMMUNICATIONS LLC, Duncan, SC (US)

(72) Inventors: Wilfred Courchaine, Moore, SC (US); Anthony Nieves, Fountain Inn, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/358,395

(22) PCT Filed: Nov. 15, 2012

(86) PCT No.: PCT/US2012/065172
§ 371 (c)(1),
(2) Date: May 15, 2014

(87) PCT Pub. No.: WO2013/074728
PCT Pub. Date: May 23, 2013

(65) Prior Publication Data
US 2014/0312753 A1    Oct. 23, 2014

Related U.S. Application Data

(60) Provisional application No. 61/559,798, filed on Nov. 15, 2011.

(51) Int. Cl.
*G02B 6/00*    (2006.01)
*G02B 6/44*    (2006.01)
*G02B 6/38*    (2006.01)

(52) U.S. Cl.
CPC ............... *G02B 6/44* (2013.01); *G02B 6/4441* (2013.01); *G02B 6/4453* (2013.01); *G02B 6/3897* (2013.01)

(58) Field of Classification Search
CPC .. G02B 6/4452; G02B 6/3897; G02B 6/4471; G02B 6/4453; G02B 6/4454
USPC .................... 385/134, 135, 136, 137
See application file for complete search history.

(56) References Cited

U.S. PATENT DOCUMENTS

| | | | |
|---|---|---|---|
| 6,385,381 B1 | 5/2002 | Janus et al. | |
| 6,658,857 B1 * | 12/2003 | George | ............................ 62/3.3 |
| 7,496,269 B1 | 2/2009 | Lee | |
| 7,743,495 B2 * | 6/2010 | Mori et al. | ...................... 29/857 |
| 8,286,325 B2 * | 10/2012 | Cooke et al. | ................. 29/527.2 |
| 2002/0150372 A1 | 10/2002 | Schray | |
| 2009/0208178 A1 | 8/2009 | Kowalczyk et al. | |
| 2010/0242251 A1 | 9/2010 | Cooke et al. | |

OTHER PUBLICATIONS

International Search Report for PCT/US2012/065172, dated Jan. 31, 2013.

* cited by examiner

*Primary Examiner* — Jennifer Doan
(74) *Attorney, Agent, or Firm* — Dority & Manning, P.A.

(57) ABSTRACT

Provided is a one-piece injection molded part which is used to assemble an optical module, the one-piece injection molded part including: a plurality of plates and a plurality of living hinges. The plurality of plates includes an input faceplate, an output faceplate, a left side plate, a right side plate, a bottom plate and a lid plate and is integrally formed.

5 Claims, 6 Drawing Sheets

MODULE, LIVING HINGE

CROSS-REFERENCE TO RELATED APPLICATIONS

This application is based upon and claims the benefit of priority from U.S. Provisional Application No. 61/559,798, filed Nov. 15, 2011, the disclosure of which is incorporated herein in their entirety by reference.

BACKGROUND

1. Field

Apparatuses and methods consistent with exemplary embodiments relate to optical modules for fiber optic transmission of signals and methods of forming the same, and more particularly, to optical modules made from a one piece injection molded part to form the optical modules and methods of forming the same.

2. Related Art

Manufacturing optical modules for fiber optic transmission of signals is an expensive undertaking. Current technology makes use of multiple components for the container and lid of optical modules. A typical construction of the optical modules involves producing painted sheet metal parts or separate molded parts and fastening the parts with separate hardware during assembly. The production of optical modules using the current technology is not only expensive, but also does not provide flexibility in manufacturing different types of optical modules having different numbers of inputs and outputs for the fiber optic transmission of signals Therefore, there is a need for providing optical modules with a lower cost and versatility to incorporate various designs for different components. The present invention has been made with the forgoing situations taken into consideration.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

In accordance with an aspect of an exemplary embodiment, there is provided a one-piece injection molded part which is used to assemble an optical module, the one-piece injection molded part including: a plurality of plates and a plurality of living hinges. The plurality of plates includes an input faceplate, an output faceplate, a left side plate, a right side plate, a bottom plate and a lid plate and is integrally formed.

The input faceplate, the output faceplate and the left and right side plates may be bent from the bottom plate at locations of the plurality of living hinges.

The lid plate includes a first locking feature which engages with a second locking feature provided on the input faceplate to keep the lid portion in a closed position.

The one-piece injection molded part may further include a plurality of wall holding member which keep the plurality of plates in an assembled position.

In accordance with an aspect of an exemplary embodiment, there is provided a method of forming an optical module from an one-piece injection molded part, the method including: providing the one-piece injection molded part comprising a plurality of plates and a plurality of living hinges; and bending the plurality of plates at locations of the plurality of living hinges. The plurality of plates is integrally formed.

The plurality of plates includes an input faceplate, an output faceplate, a left side plate, a right side plate, a bottom plate. The input faceplate, the output faceplate and the left and right side plates are bent from the bottom plate at locations of the plurality of living hinges.

DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings. If the components are the same in different drawings, the same item numbers are used to the extent possible for ease of reference.

Figure 1A:
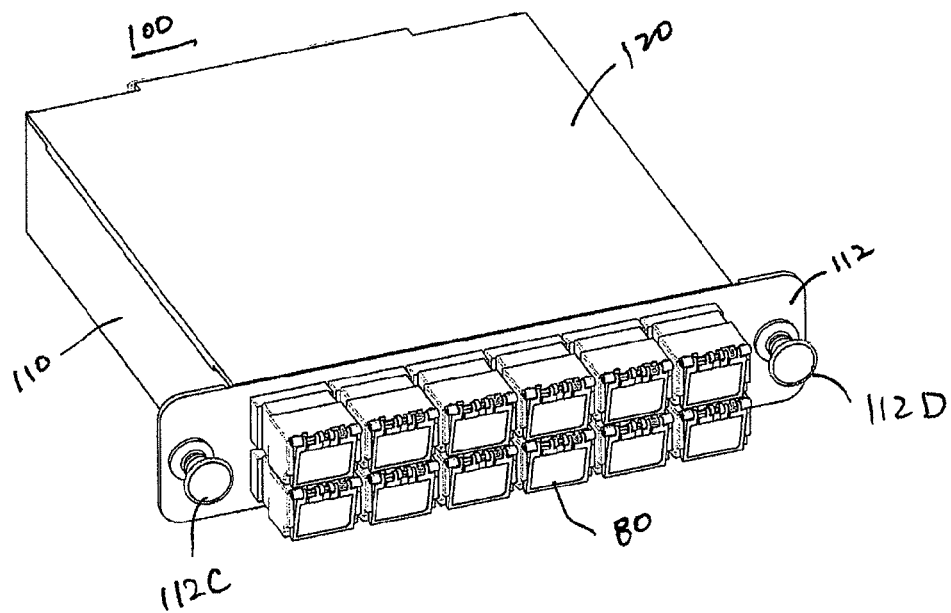
FIG. 1A shows a front isometric view of an assembled optical module according to an exemplary embodiment.
Figure 1B:
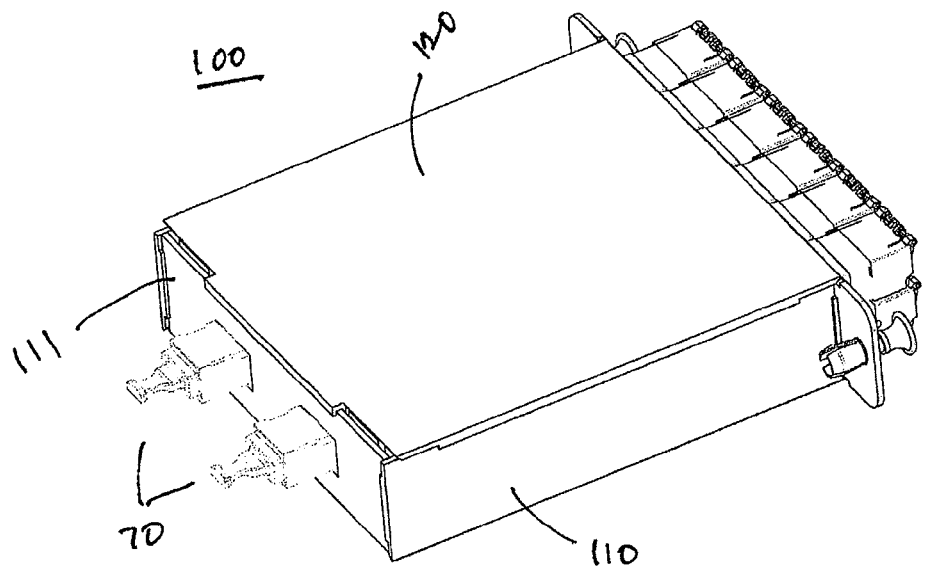
FIG. 1B shows a rear isometric view of the assembled optical module according to the exemplary embodiment.

According to an exemplary embodiment, an assembled optical module 100 is described with reference to FIGS. 1A and 1B. FIG. 1A shows a front isometric view of an assembled optical module 100 according to an exemplary embodiment and FIG. 1B shows a rear isometric view of the assembled optical module 100 according to the exemplary embodiment. The optical module 100 includes a container portion 110 and a lid portion 120. The container portion 110 is formed by an input faceplate 111, an output faceplate 112, a left and right side plates 113 and 114 and a bottom plate 115 (See also FIG. 2). The input faceplate 111 and the output faceplate 112 includes input slots (111S) and output slots (112S) where fiber optic transmission input adaptors 70 and fiber optic transmission output adaptors 80 are installed.

As shown in FIGS. 1A and 1B, the output faceplate 112 includes apertures 112A and 112B (shown in FIG. 2) where nylatches 112C and 112D can be inserted. The nylatches 112C and 112D function as fasteners to attach the optical module 100 to brackets of a housing (not shown).

Figure 2:
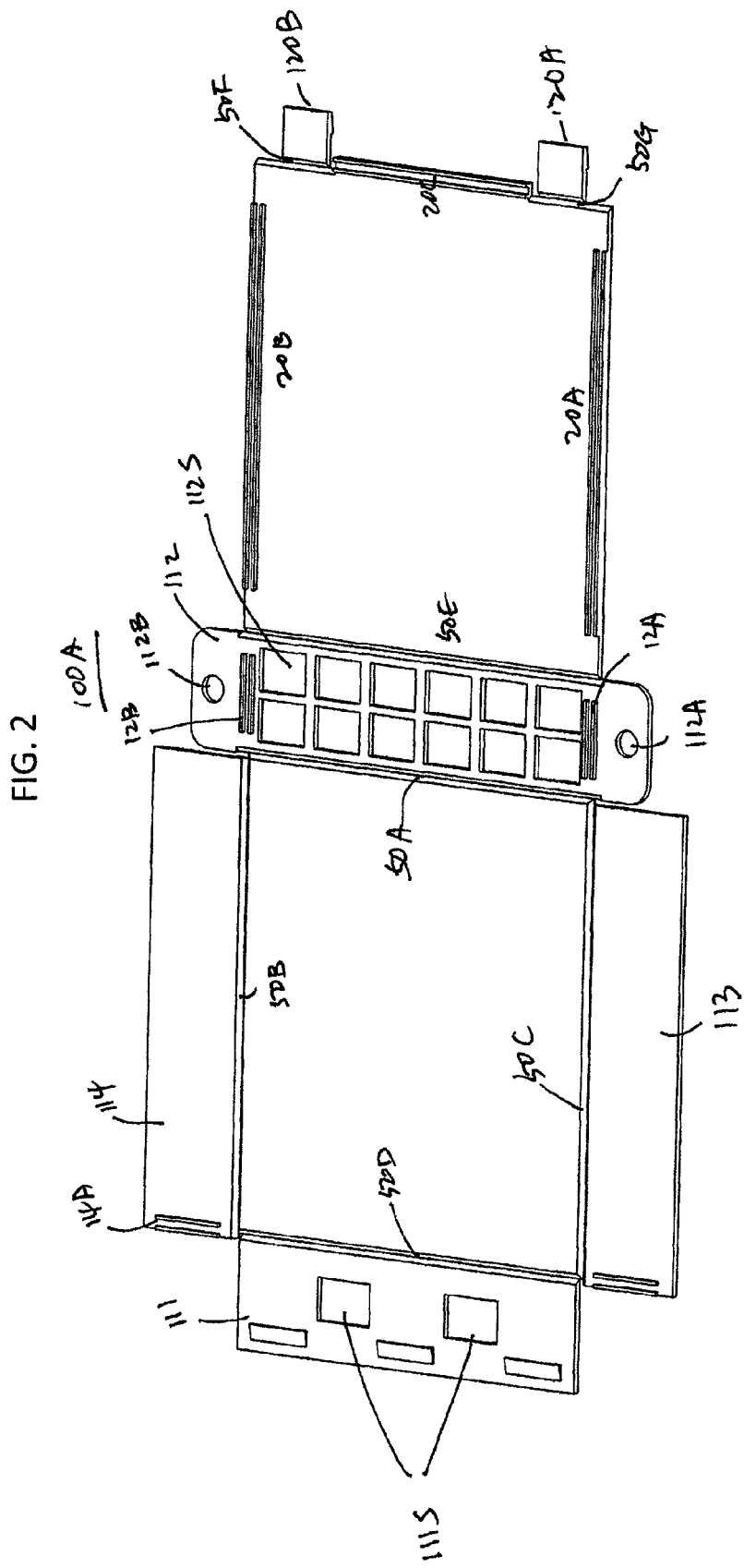
FIG. 2 shows an isometric view of a one-piece injection molded part which forms the optical module shown in FIGS. 1A and 1B.

FIG. 2 shows an isometric view of a one-piece injection molded part 100A which forms the optical module shown in FIGS. 1A and 1B of the exemplary embodiment. The one-piece injection molded part 100A includes a container portion 110 made up of an input faceplate 111, an output faceplate 112, a left and right side plates 113 and 114 and a bottom plate 115 and a lid portion 120. The exemplary embodiment shows the input and output faceplates 111 and 112 and the left and right faceplates 113 and 114 attached to the bottom plate 115 and the lid portion 120 attached to the output faceplate 112. However, the exemplary embodiment is not limited thereto. For example, the left and right faceplates 113 and 114 may be attached to the lid portion 120 or the lid portion 120 may be attached to either the left faceplate 113 or the right faceplate 114. One of ordinary skill in the art would understand that there may be various ways to form the one-piece injection molded part 100A.

Figure 5A:
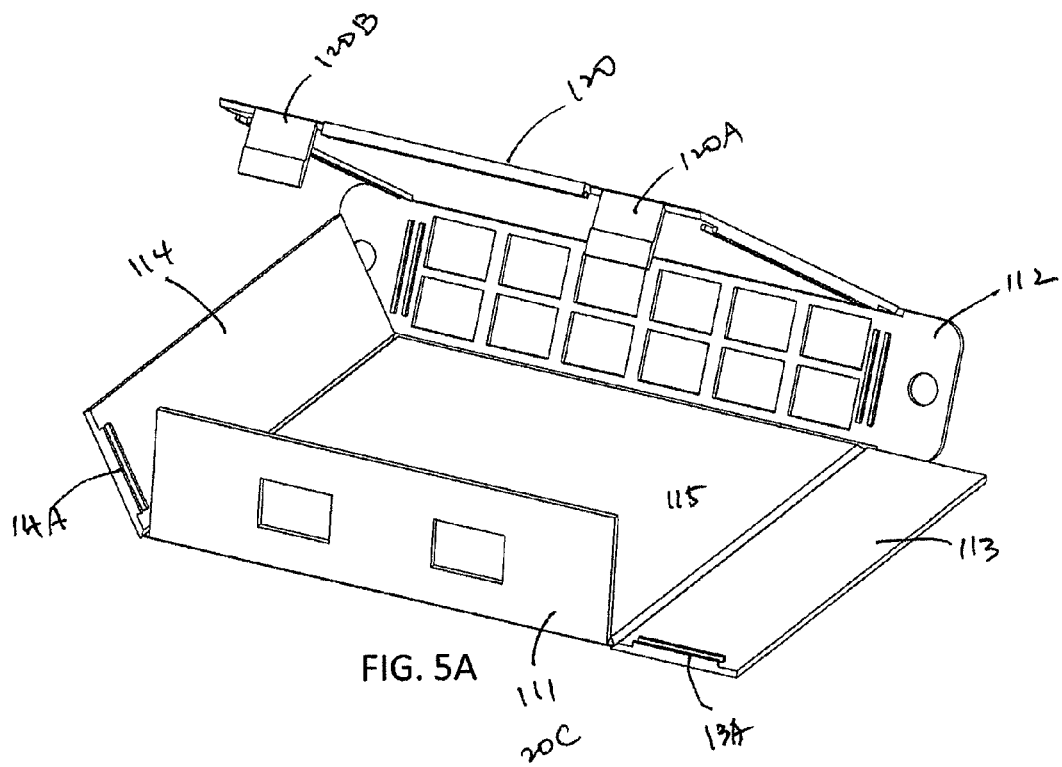
FIG. 5A shows a rear isometric view of the one-piece injection molded part where side walls attached to a bottom surface of the optical modules are bent.
Figure 5B:
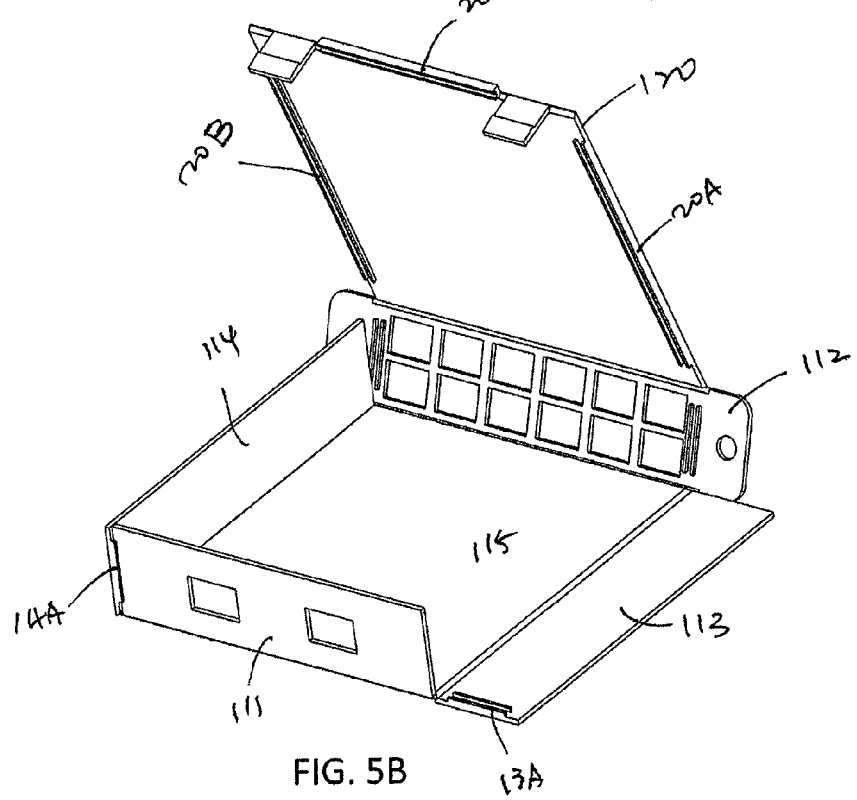
FIG. 5B shows a rear isometric view of the one-piece injection molded part where a left side wall is holding an input faceplate of the optical modules.

The one-piece injection molded part 100A includes living hinges 50A, 50B, 50C and 50D disposed on the container portion 110 of the optical module 100 and also includes living hinges 50E, 50F and 50G of the lid portion 120 of the optical module 100. The living hinges 50A-50D are disposed between the bottom plate 115 and each of output faceplate 112, right faceplate 114, input faceplate 111 and the left faceplate 113, respectively. The living hinges 50A-50D allow the input faceplate 111, the output faceplate 112, the left and right side plates 113 and 114 of the one-piece injection molded part 100A to bend to form the container portion 110 of the optical module 100 as shown in FIGS. 5A and 5B in more detail.

Figure 6:
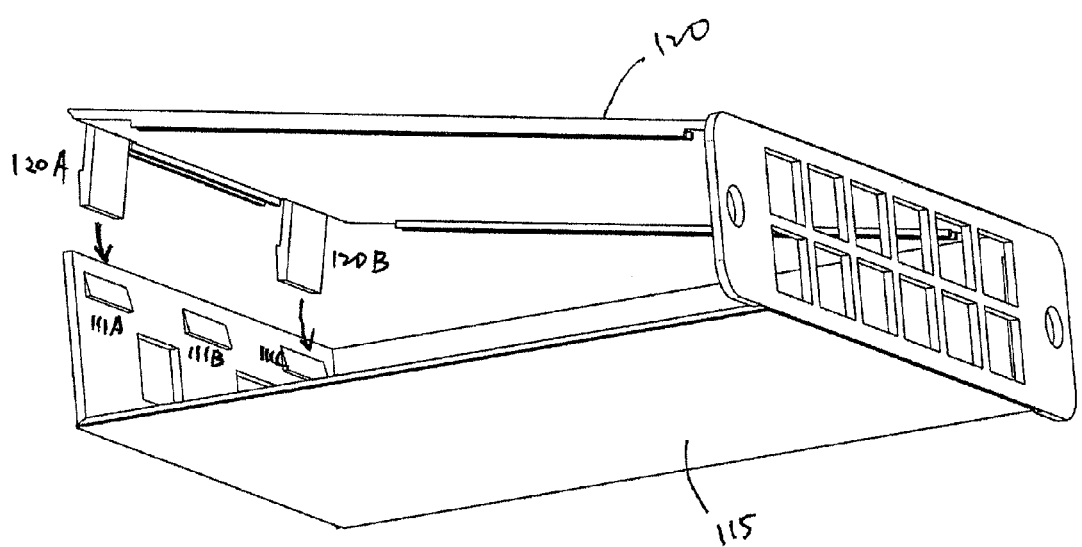
FIG. 6 shows a side isometric view of the partially assembled optical module with a lid open and side wall removed to show internal features.

Similarly, the living hinge 50E is disposed between the output faceplate 112 and the lid portion 120 and allows the lid portion 120 of the one-piece injection molded part 100A to bend to completely cover the container portion 110 of the optical module 100. The living hinges 50F and 50G are disposed between the lid portion 120 and each of the lid snaps 120A and 120B and allow the lid snaps 120A and 120B to bend and to engage with faceplate locking features 111A-111C to keep the lid portion 120 in a closed position. In detail, when the lid portion 120 covers the container portion 110 of the optical module, the lid snaps 120A and 120B snaps onto the faceplate locking features 111A-111C to hold the lid portion 120 in the closed position as shown in FIG. 6. Once the lid portion is in the closed position as shown in FIGS. 1A and 1B, the optical module 100 has no visible means of opening.

In the present exemplary embodiment, the lid snaps are used as lid locking features. However, the exemplary embodiment is not limited thereto. One of ordinary skill in the art would understand that any other locking mechanism may be used to provide to keep the lid portion 120 in the closed position.

As shown in FIG. 2, the output faceplate 112, the left and right side plates 113 and 114 and the lid portion 120 of the one-piece injection molded part 100A includes wall holding features 12A, 12B, 13A, 14A, 20A, 20B and 20C which hold adjoining walls together. The wall holding features 12A, 12B, 13A, 14A, 20A, 20B and 20C are integral part of the one-piece injection molded part 100A and therefore, no separate hardware is necessary to hold the walls of the optical module 100 together. In detail, the wall holding features 13A and 14A of the left and right side plates 113 and 114 hold the input faceplate 111 to form the container portion 110 of the optical module 110 from the one-piece injection molded part 100A. Similarly, the wall holding features 12A and 12B of the output faceplate 112 hold the left and right side plates 113 and 114, respectively, to form the container portion 110 of the optical module 110 from the one-piece injection molded part 100A. The wall holding features 20A and 20B of the lid portion 120 hold the left and right side plates 113 and 114, respectively, to form the container portion 110 of the optical module 110 from the one-piece injection molded part 100A. Finally, the wall holding feature 20C of the lid portion 120 holds the input faceplate 111 to form the container portion 110 of the optical module 110 from the one-piece injection molded part 100A. FIGS. 5A and 5B illustrate the wall holding features 12A, 12B, 13A, 14A, 20A, 20B and 20C engaging with the input faceplate 111, the output faceplate 112, the left and right side plates 113 and 114 and the lid portion 120.

Figure 3A:
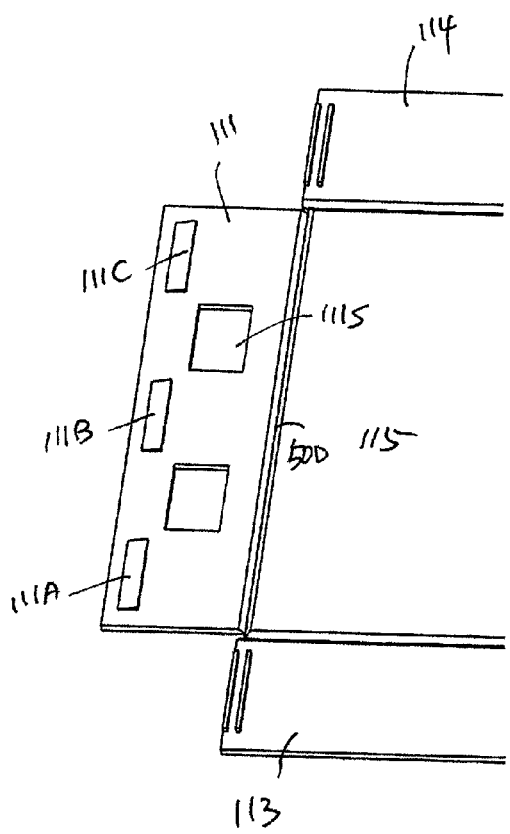
FIG. 3A shows an enlarged isometric view of an input faceplate of the one-piece injection molded part of FIG. 2.
Figure 3B:
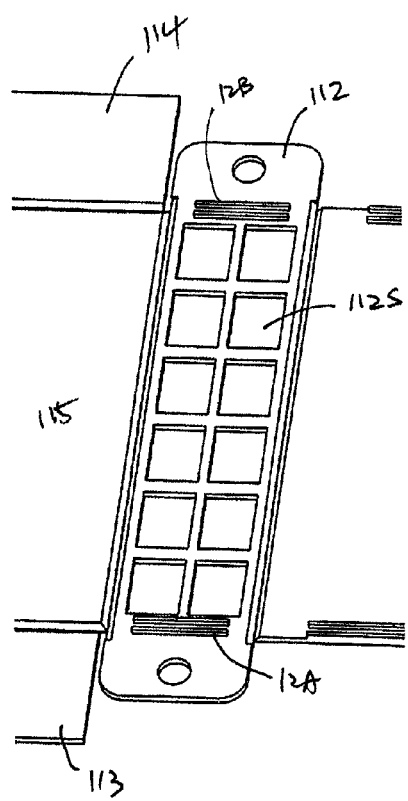
FIG. 3B shows an enlarged isometric view of an output faceplate of the one-piece injection molded part of FIG. 2.

FIG. 3A shows an enlarged isometric view of an input faceplate of the one-piece injection molded part of FIG. 2 and FIG. 3B shows an enlarged isometric view of an output faceplate of the one-piece injection molded part of FIG. 2. In the present exemplary embodiment, the input faceplate 111 includes two (2) input slots 111S for two (2) MP inputs as the fiber optic transmission input adaptors 70 and the output faceplate includes twelve (12) output slots 112S for twelve (12) shuttered LC duplex output interface components as the fiber optic transmission output adaptors 80. The inputs and outputs come into and out of the module by means of fiber adapters. The fibers have connectors on the ends and the connectors snap into the adapters. There are several types of adapters, for the various connector/adapter interfaces in the industry. SC and LC are common types used for single fibers. There are also several multi-port or MP type adapters and connectors in the field. All of these and some not mentioned standard formats can snap into the input slots 111S and the output slots 112S on the input faceplate 111 and the output faceplate 112.

However, the exemplary embodiment is not limited thereto. The optical module 100 may include any number of input and output components as the fiber optic transmission input adaptors 70 and the fiber optic transmission output adaptors 80. Also, the optical module 100 may be used for accepting different types of adaptors.

Figures 4A, 4B:
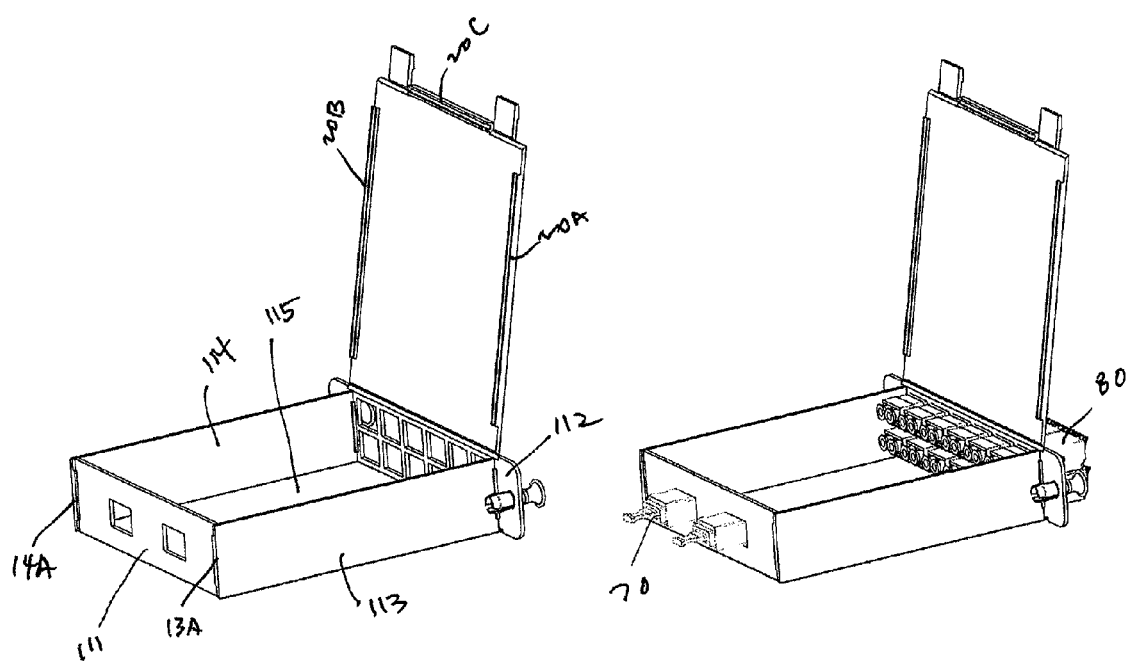
FIG. 4A shows an isometric view of a partially assembled optical module with a lid open.
FIG. 4B shows an isometric view of the partially assembled optical module with a lid open and fiber optics input and output adaptors installed.

FIG. 4A shows an isometric view of a partially assembled optical module with a lid open and FIG. 4B shows an isometric view of the partially assembled optical module with a lid open and fiber optics input and output adaptors installed. As shown in FIGS. 4A and 4B, the container portion 110 of the optical module 100 is formed by bending the input faceplate 111, the output faceplate 112 and the left and right side plates 113 and 114 to a vertical direction from a horizontal direction and holding the input faceplate 111, the output faceplate 112 and the left and right side plates 113 and 114 in the vertical position by the wall holding features 12A, 12B, 13A and 14A.

In the exemplary embodiment, two (2) parallel ribs work together as the wall holding features 12A, 12B, 13A, 14A, 20A, 20B and 20C. However, the exemplary embodiment is not limited thereto. For example, in FIG. 5A instead of the left side plate 113 having the parallel ribs to hold the input faceplate 111 in place, the left side plate may include an elongated slot and the input faceplate 111 may be inserted into the slot. Also, in this example, the input faceplate 111 may include a protrusion to be inserted into the slot on the left side plate 113. So long as the wall holding members can be manufactured from the injection molding process as part of the one-piece injection molded part 100A, various designs may be implemented for the wall holding members.

When the lid portion 120 of the optical module 100 covers the container portion of the optical module 100, The wall holding features 20A and 20B of the lid portion 120 hold the left and right side plates 113 and 114 and the wall holding feature 20C of the lid portion 120 holds the input faceplate 111 in place. The wall holding features 12A, 12B, 13A, 14A, 20A, 20B and 20C keep the input faceplate 111, the output faceplate 112, the left and right side plates 113 and 114, the bottom plate 115 and the lid portion 120 in an assembled position. Further, when closed, the lid snaps 120A and 120B that holds the unit in its completed form is hidden such that it is not obvious how to open the container.

As shown in the exemplary embodiment, the one-piece injection molded part 100A is in a nearly flat condition which enables shipping of the parts in a high density arrangement so that more parts can be shipped per volume of space. The assembler does not have to grasp and manipulate multiple components and therefore the time to assemble the product is reduced. All of the above features enable lower cost per unit as needed for the current economic situation.

Advantages of the exemplary embodiments lie mostly in the cost of material and the cost of assembly. The unit is one piece which replaces sheet metal assemblies or multi part plastic assemblies. It can be shipped in its flat form which allows for more units per volume of shipping and storing space. In assembly, there is only one component to make up the entire container and lid which reduces inventory as well as logistic costs.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation.

What is claimed:

1. A one-piece injection molded part which is used to assemble an optical module, the one-piece injection molded part comprising:
   a plurality of plates comprising:
   an input faceplate comprising at least one input slot configured to allow entry of an input component;
   an output faceplate comprising at least one output slot configured to allow entry of an output component;
   a left side plate;
   a right side plate;
   a bottom plate; and
   a lid plate; and
   a plurality of living hinges,
   wherein the plurality of plates is integrally formed; and
   wherein the lid plate comprises a first locking feature configured to engage with a second locking feature provided on an interior surface of the input faceplate to keep the lid portion in a closed position.

2. The one-piece injection molded part of claim 1, wherein the input faceplate, the output faceplate and the left and right side plates are bent from the bottom plate at locations of the plurality of living hinges.

3. The one-piece injection molded part of claim 1 further comprising a plurality of wall holding members which keep the plurality of plates in an assembled position.

4. A method of forming an optical module from a one-piece injection molded part comprising a plurality of plates, a plurality of living hinges, an input plate of the plurality of plates comprising at least one input slot configured to allow entry of an input component, an output plate of the plurality of plates comprising at least one output slot configured to allow entry of an output component, and a lid plate of the plurality of plates comprising a first locking feature which engages with a second locking feature provided on the input faceplate of the plurality of plates to keep the lid portion in a closed position, the method comprising:
   bending the plurality of plates at locations of the plurality of living hinges,
   wherein the plurality of plates is integrally formed; and
   engaging the first locking feature and the second locking feature thereby keeping the lid portion in a closed position.

5. The method of claim 4, wherein the plurality of plates comprises:
   a left side plate;
   a right side plate; and
   a bottom plate;
   wherein the input faceplate, the output faceplate and the left and right side plates are bent from the bottom plate at locations of the plurality of living hinges.

* * * * *